US008924787B2

(12) United States Patent
Lumezanu et al.

(10) Patent No.: US 8,924,787 B2
(45) Date of Patent: Dec. 30, 2014

(54) NETWORK DEBUGGING

(71) Applicant: NEC Laboratories America, Inc., Princeton, NJ (US)

(72) Inventors: Cristian Lumezanu, East Windsor, NJ (US); Guofei Jiang, Princeton, NJ (US); Yueping Zhang, Princeton, NJ (US); Vishal Singh, Princeton, NJ (US); Ahsan Arefin, Champaign, IL (US)

(73) Assignee: NEC Laboratories America, Inc., Princeton, NJ (US)

( * ) Notice: Subject to any disclaimer, the term of this patent is extended or adjusted under 35 U.S.C. 154(b) by 192 days.

(21) Appl. No.: 13/736,158

(22) Filed: Jan. 8, 2013

(65) Prior Publication Data
US 2014/0047274 A1 Feb. 13, 2014

Related U.S. Application Data

(60) Provisional application No. 61/590,042, filed on Jan. 24, 2012.

(51) Int. Cl.
*G06F 11/00* (2006.01)
*G06F 11/34* (2006.01)
*G06F 11/30* (2006.01)
*G06F 11/07* (2006.01)

(52) U.S. Cl.
CPC ........ *G06F 11/3476* (2013.01); *G06F 11/3006* (2013.01); *G06F 11/3017* (2013.01); *G06F 11/302* (2013.01); *G06F 11/3055* (2013.01); *G06F 11/0793* (2013.01)
USPC ........................................... 714/26; 717/104

(58) Field of Classification Search
USPC ......................................................... 714/26
See application file for complete search history.

(56) References Cited

U.S. PATENT DOCUMENTS

| | | | | |
|---|---|---|---|---|
| 7,376,945 | B1 * | 5/2008 | Kakumani et al. | 717/171 |
| 8,185,781 | B2 * | 5/2012 | Chen et al. | 714/26 |
| 8,776,009 | B2 * | 7/2014 | Dayan et al. | 717/104 |
| 2006/0029016 | A1 * | 2/2006 | Peles | 370/328 |
| 2006/0190594 | A1 * | 8/2006 | Jorgenson et al. | 709/224 |
| 2008/0209413 | A1 * | 8/2008 | Kakumani et al. | 717/172 |
| 2009/0182794 | A1 | 7/2009 | Sekihuchi | |
| 2010/0262858 | A1 * | 10/2010 | Chen et al. | 714/2 |
| 2013/0205376 | A1 * | 8/2013 | Narasimha et al. | 726/6 |
| 2013/0254891 | A1 * | 9/2013 | Onoda | 726/23 |
| 2013/0258898 | A1 * | 10/2013 | Gao et al. | 370/252 |
| 2014/0112190 | A1 * | 4/2014 | Chou et al. | 370/254 |

OTHER PUBLICATIONS

P. Bahl, R. Chandra, A. Greenberg, S. Kandual, D. Maltz, and M. Zhang, "Towards highly reliable enterprise network services via inference of multi-level dependencies," in Proc. SIGCOMM'07, Aug. 2007, pp. 13-24.

X. Chen, M. Zhang, Z. Morley, and M. P. Bahl,"Automating Network Application Dependency Discovery:Experiences, Limitations, and New Solutions," in Proc. of OSDI, 2008.

R. Fonseca, G. Porter, R. H. Katz, S. Shenker, and I. Stoica, "X-Trace: A Pervasive Network Tracing Framework," in Proc. USENIX NSDI, Cambridge, MA, USA, 2007.

D. Geels, G. Altekar, S. Shenker, and I. Stoica, "Replay debugging for distributed applications," in Proc.Proceedings of the annual conference on USENIX '06 Annual Technical Conference.

S. Kandula, R. Mahajan, P. Verkaik, S. Agarwal, J. Padhye, and P. Bahl, "Detailed diagnosis in enterprise networks." in Proc. SIGCOMM, 2009.

L. Popa, B.-G. Chun, I. Stoica, J. Chandrashekar, and N. Taft, "Macroscope: End-Point Approach to Networked Application Dependency Discovery," in Proc. ACM CoNEXT, 2009.

A. Wundsam, D. Levin, S. Seetharaman, and A. Feldmann, "OFRewind: Enabling Record and Replay Troubleshooting for Networks," in Proc. Proceedings of Usenix ATC 2011.

* cited by examiner

*Primary Examiner* — Kamini Patel
(74) *Attorney, Agent, or Firm* — Joseph Kolodka; Akitaka Kimura

(57) ABSTRACT

A debugging system used for a data center in a network is disclosed. The system includes a monitoring engine to monitor network traffic by collecting traffic information from a network controller, a modeling engine to model an application signature, an infrastructure signature, and a task signature using a monitored log, a debugging engine to detect a change in the application signature between a working status and a non-working status using a reference log and a problem log, and to validate the change using the task signature, and a providing unit to provide toubleshooting information, wherein an unknown change in the application signature is correlated to a known problem class by considering a dependency to a change in the infrastructure signature. Other methods and systems also are disclosed.

16 Claims, 9 Drawing Sheets

NETWORK DEBUGGING

This application claims the benefit of U.S. Provisional Application No. 61/590,042, entitled, "OFDiff: A Debugging Tool for OpenFlow Based Data Center," filed on Jan. 24, 2012, the contents of which are incorporated herein by reference. This application is related to U.S. patent application Ser. No. 13/554,632 and U.S. patent application Ser. No. 13/556,930, the contents of both of which are incorporated herein by reference.

BACKGROUND OF THE INVENTION

The present invention relates to network debugging and, more particularly, to network debugging for a data center.

Modern data centers are very large in the order of thousands of servers and network components. They all claim on-demand resource provisioning and 24×7 system availability to the users though it is very hard to eradicate all hardware and software failures in such complex and large scale infrastructures. There have been many incidents recently where failures has lead to unavailability of services and the lack of efficient debugging has caused heavy commercial losses to the businesses. The fact is, efficient debugging of failures and misconfiguration in such large scale data centers is very difficult. Applications not only interact with each other but also interact with infrastructure services in diverse ways. Moreover, there is a strict line of visibility restriction between the application layer and the infrastructure layer, which limits the data center operators to look inside the applications for any debugging purposes. There is currently also no easy way for the operators to verify the success of management operations in the data center. Therefore, efficient data center wide debugging is still an open research area in computer science.

Existing commercial or academic [1, 2, 5, 6] solutions have taken a microscopic approach, where people try to diagnose issues on specific servers or processes using domain knowledge (like agents) or statistical techniques. Data center wide debugging using coarse-grained and light-weight monitoring remains a challenge. The previous techniques are focused on extracting per application dependency graph (in most cases, using network flow concurrency or delay properties) and use it for diagnosis purposes. Commercial solutions have been relying on enterprise management solutions, which require agents to be installed with semantic knowledge of application protocols and applications configuration files. Efforts have been ongoing to apply model checking to distributed states. Furthermore, people have tried instrumentation for tracing [3] requests and use of record and replay using distributed system logging [4] and using network traffic [7]. The current approaches are far from practically deployable. Typically, the solutions require heavy instrumentation resulting in a lot of overhead. Also the commercial cloud is heterogeneous, which poses additional problems for instrumentation. To sum up, intrusive monitoring, scalability issues in deployment, network overhead and insufficient data availability are some of the challenges in data center debugging.

OFDiff approaches the problem from a unique angle and takes advantage of OpenFlow's monitoring capabilities built upon message exchange in its control plane. Basically OFDiff captures network traffic from the OpenFlow controller for debugging purpose. The debugging is done by using logs of working and non-working states. To compare them, OFDiff models application and infrastructure level behavior of the data center of the corresponding logging period. Any changes in the application signatures (e.g., a different connectivity graph, or change in application response time) captured from those logs are considered to explain using operational tasks. The operational tasks are also identified from the traffic logs using a pattern matching algorithm to the previously known tasks' patterns (learned offline also from OpenFlow traffic logs). Application layer changes (detected by OFDiff), which cannot be attributed to well known operational tasks are further correlated to the infrastructure level changes to identify problem class in the data center. Finally we correlate the problem class to the system components for further troubleshooting purposes.

[1] P. Bahl, R. Chandra, A. Greenberg, S. Kandual, D. Maltz, and M. Zhang, "Towards highly reliable enterprise network services via inference of multi-level dependencies," in Proc. SIGCOMM'07, August 2007, pp. 13-24.

[2] X. Chen, M. Zhang, Z. Morley, and M. P. Bahl, "Automating Network Application Dependency Discovery: Experiences, Limitations, and New Solutions," in Proc. of OSDI, 2008.

[3] R. Fonseca, G. Porter, R. H. Katz, S. Shenker, and I. Stoica, "X-Trace: A Pervasive Network Tracing Framework," in Proc. USENIX NSDI, Cambridge, Mass., USA, 2007.

[4] D. Geels, G. Altekar, S. Shenker, and I. Stoica, "Replay debugging for distributed applications," in Proc. Proceedings of the annual conference on USENIX '06 Annual Technical Conference.

[5] S. Kandula, R. Mahajan, P. Verkaik, S. Agarwal, J. Padhye, and P. Bahl, "Detailed diagnosis in enterprise networks." in Proc. SIGCOMM, 2009.

[6] L. Popa, B.-G. Chun, I. Stoica, J. Chandrashekar, and N. Taft, "Macroscope: End-Point Approach to Networked Application Dependency Discovery," in Proc. ACM CoNEXT, 2009.

[7] A. Wundsam, D. Levin, S. Seetharaman, and A. Feldmann, "OFRewind: Enabling Record and Replay Troubleshooting for Networks," in Proc. Proceedings of Usenix ATC 2011.

BRIEF SUMMARY OF THE INVENTION

OFDiff offers very powerful data center debugging capabilities by using available logs from the OpenFlow's unique messaging mechanism.

An objective of the present invention is to contribute to achieving system situation awareness in a network and to troubleshooting (or debugging) for a system such as a data center.

An aspect of the present invention includes, in a debugging system used for a data center in a network, a monitoring engine to monitor network traffic by collecting traffic information from a network controller, a modeling engine to model an application signature, an infrastructure signature, and a task signature using a monitored log, and a debugging engine to detect a change in the application signature between a working status and a non-working status using a reference log and a problem log, and to validate the change using the task signature, and a providing unit to provide toubleshooting information, wherein an unknown change in the application signature is correlated to a known problem class by considering a dependency to a change in the infrastructure signature.

Another aspect of the present invention includes, in a debugging method used for a data center in a network, monitoring network traffic by collecting traffic information from a network controller, modeling an application signature, an infrastructure signature, and a task signature using a monitored log, detecting a change in the application signature between a working status and a non-working status using a reference log and a problem log, validating the change using the task signature, and providing toubleshooting information, wherein an unknown change in the application signature is correlated to a known problem class by considering a dependency to a change in the infrastructure signature.

BRIEF DESCRIPTION OF THE DRAWINGS

FIG. 2 depicts a flow chart which system architecture is mapped to.

DETAILED DESCRIPTION

Figure 1:
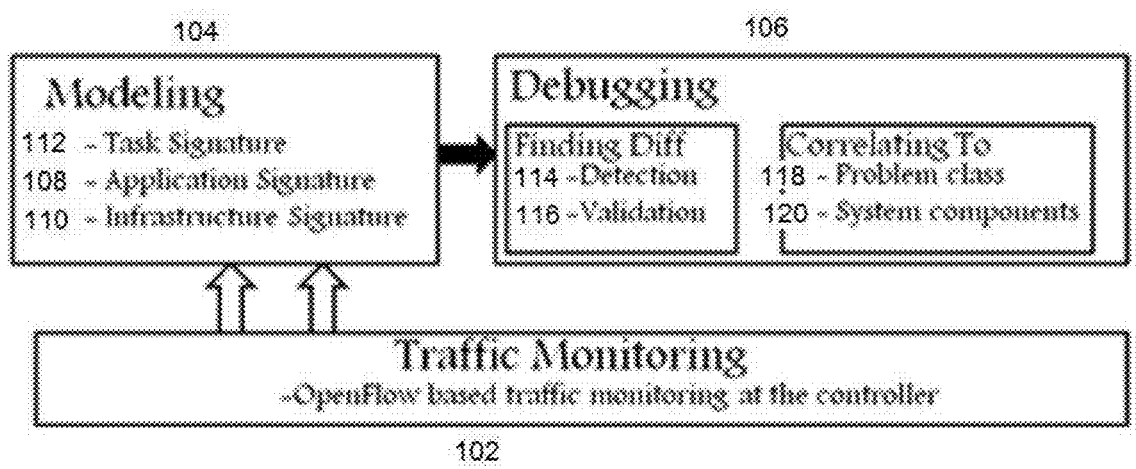
FIG. 1 depicts system architecture.

System Architecture:

As illustrated in FIG. 1, OFDiff collects traffic information from the OpenFlow controller PacketIn and PacketOut messages in step 102. Other active traffic monitoring protocol at the switches can also be used. The system has three major components: Monitoring 102, Modeling 104 and Debugging 106. As explained before, the monitoring engine collects the traffic information in step 102. The modeling engine models data center application (108), infrastructure (110) and task (112) signatures using monitored logs in step 104. Regarding step 106, the debugging engine first finds the differences in application signatures between the working and non-working states using the reference and problem logs, respectively, in step 114. Then it validates the changes by using task signatures in step 116. The unknown changes are correlated to the known problem classes considering their dependencies to the changes in infrastructure signatures in step 118. We use class specific correlation enquiry to finally find the problematic or faulty system components in step 120.

Figure 2:
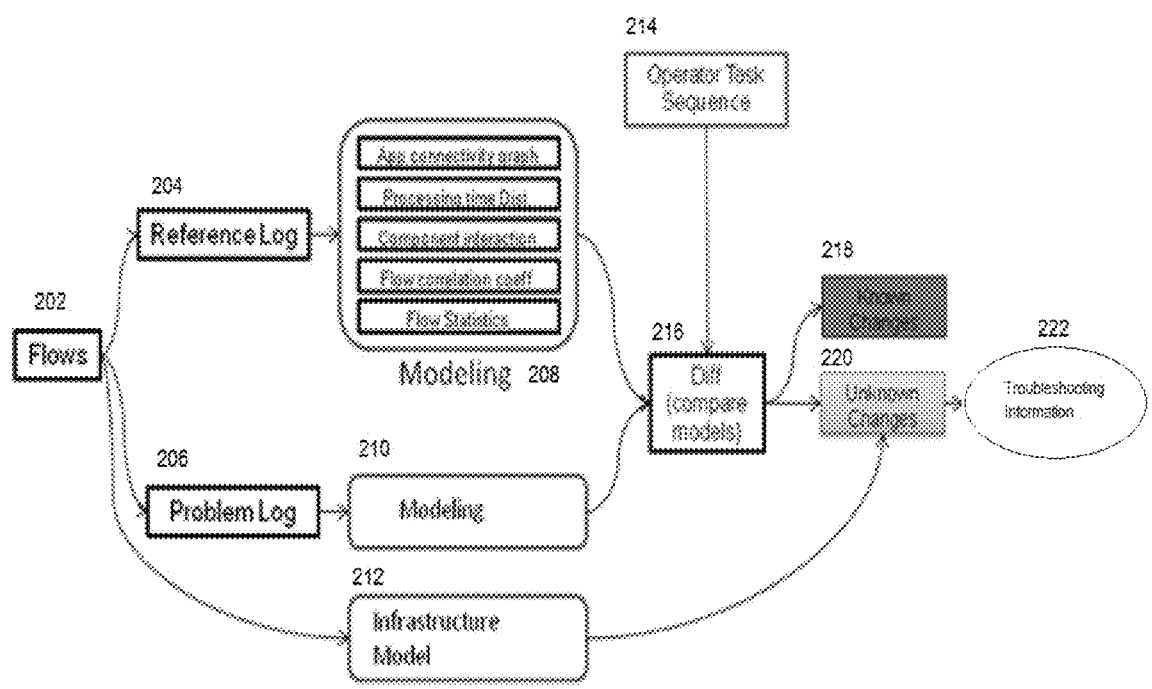

The above system architecture can be mapped to FIG. 2. OFDiff collects reference log 204 and problem log 206 from the OpenFlow controller (not shown). It parses reference log 204 to model application signatures under normal behavior (for example, connectivity graph, delay distribution, component interaction, partial correlation, and flow statistics) in block 208. OFDiff also parses problem log 206 to model application signatures under suspicious behavior in block 210. It then compares the signatures in the two logs in block 216. Using task sequence of known operator tasks 214, it identifies the changes between the reference and problem logs as either known changes 218 (e.g., due to a known operator task) or unknown changes 220. Further, OFDiff analyzes the unknown changes using infrastructure signatures 212 extracted from the flows and provides troubleshooting information 222 to operator.

Procedure 1: Modeling Application Signatures

The goal of modeling application signatures is to capture the application behavior running inside the data center. To cover the spatial, temporal and volume dimension of applications, OFDiff models application signatures, for example, in terms of Procedure 1.1 Connectivity Graph (CG), Procedure 1.2 Delay Distribution (DD), Procedure 1.3 Component Interaction (CI), Procedure 1.4 Partial Correlation (PC) and Procedure 1.5 Flow Statistics (FS). We next elaborate each procedure.

Procedure 1.1: Connectivity Graph (CG)

Using source and destination IP (Internet Protocol) metadata that comes in the PacketIn message or the IP header in TCP (Transmission Control Protocol) packets, OFDiff detects who (which application node) is talking to whom. A connectivity graph or CG is built out of it for each application group.

Procedure 1.2: Delay Distribution (DD)

OFDiff uses peaks of the delay distribution as the application signature with the goal to detect the shift in peaks or their disappearance due to the anomalies in the data center (such as node overload, link congestion, etc.).

Procedure 1.3: Component Interaction (CI)

Figure 3:
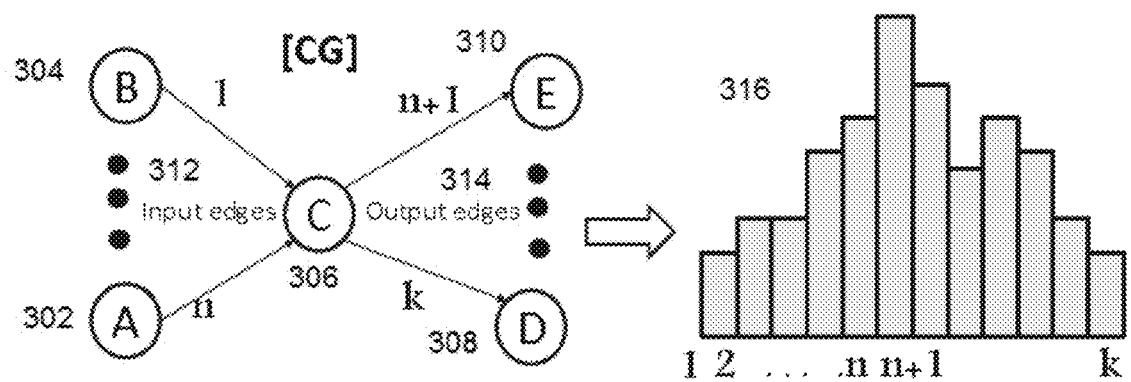
FIG. 3 depicts component interaction (CI) in Procedure 1.3.

As shown in FIG. 3, to measure component interaction or CI at each node 302, 304, 306, 308, or 310 in CG, OFDiff uses flow volumes at each of input and output edges 312 and 314 of node 306. The value is normalized with the total number of communication to and from the node and represented using histogram 316.

Procedure 1.4: Partial Correlation (PC)

Though the delay distribution captures the dependent flows and their delay bound, the strength of the dependency is still unknown. To measure this, we use the partial correlation between adjacent edges in the Connectivity Graph using flow volume statistics. The logging interval is divided into equal spaced epoch intervals. Using the PacketIn message at each epoch interval OFDiff measures the flow count for each edge in the CG. We then use Pearson's coefficient for computing correlation over these time-series data.

Procedure 1.5: Flow Statistics (FS)

Using the controller log, we measure statistical values of application flows at each application edge as well as application node. The statistical measurement includes flow counts per unit time and flow size. As the statistical value can be biased depending on time (e.g., some applications are used heavily during the day time compared to the night time), we keep or save max, min and average values for each case.

Procedure 1.6: Stability of Signatures

Figure 4:
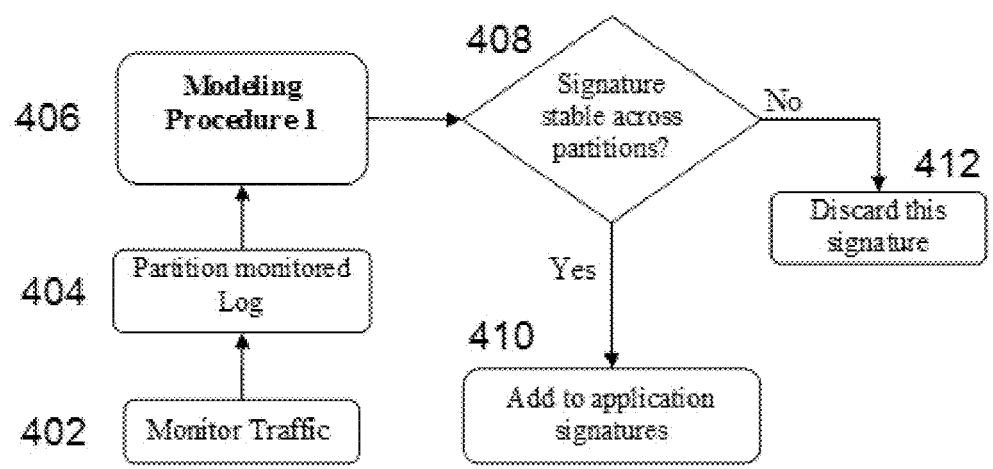
FIG. 4 depicts a flow chart for Procedure 1.6.

However, in some application groups, some of the signatures may not be stable e.g., if an application node does not use any linear decision logic across its outgoing flows, the component interaction signature becomes unstable, similar instability is found when we measure the delay distribution or partial correlation between two independent flows. Unstable signatures may not be used in the application signatures for the comparison purpose to avoid the false positive in raising the debugging flag. Therefore, the flow chart in FIG. 4 is executed for each application signature. Given a reference log in step 402 to compute the application behavior, OFDiff only considers the stable application signatures. To detect signatures stability, OFDiff partitions the log into several time intervals in step 404 and computes the application signatures for all intervals in step 406. If for an application group, a signature does not change significantly across all partitions in step 408, it is considered as a stable signature for that application group in step 410. If the signature changes substantially in step 408, OFDiff discards the signatures as being unstable in step 412.

Procedure 2: Modeling Infrastructure Signatures

Figure 5:
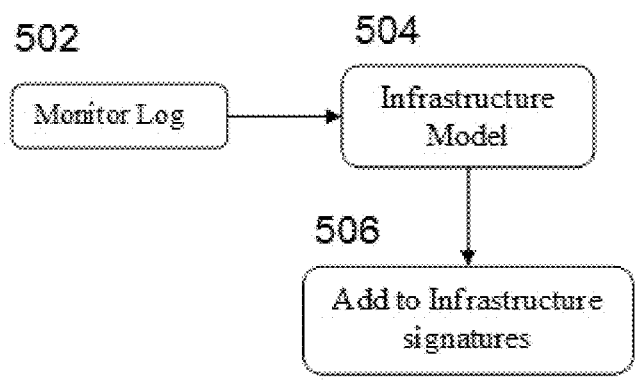
FIG. 5 depicts a flow chart for Procedure 2.

In reference to FIG. 5, the goal of infrastructure signature is to characterize the physical infrastructure in step 504 using the captured log in step 502. The physical infrastructure comprises different physical components (switches, routers and physical hosts). The signature of physical topology captures how physical hosts, switches and routers are physically connected and their link characteristics such as latency and utilization.

In particular, we can use Procedure 2.1 Physical topology, Procedure 2.2 Inter-switch latency, and Procedure 2.3 OpenFlow controller characterization to model the infrastructure signature.

Procedure 2.1: Physical Topology

We build a physical topology map based on PacketIn and PacketOut messages. The PacketIn message contains information about the switch, the ingress port and other packet fields. The PacketOut contains information about the output port it needs to be sent. Subsequently, another PacketIn is received from the next switch. This gives enough information to stitch the physical connectivity of switches and construct the physical topology.

Procedure 2.2: Inter-Switch Latency

The Inter-switch latency measures the delay between any two switches in the data center. When a flow arrives at a switch that has no matching entry in the flow table, it sends a PacketIn message to the controller. For a new flow, such reporting is done by all the switches along the path. Using the timestamp of the receiving message at the PFC (OpenFlow controller), OFDiff computes the inter-switch latency.

Procedure 2.3: OpenFlow Controller Characterization

OpenFlow controller can be characterized in terms of its response time and throughput. Controller Response Time defines the time the controller takes to reply a PacketOut message in response to a PacketIn. The controller response time is measured by taking the difference in timestamp between a PacketIn message and its corresponding PacketOut message. For an efficient switching protocol and data center communication, it is desirable that this time difference be fairly small. Similar to the previous signature, we use a statistical mean of the response time along with the standard deviation as the Controller Response (CRT) Time signature.

Procedure 3: Modeling Tasks Signatures->Operator Task Sequence

Figure 6:
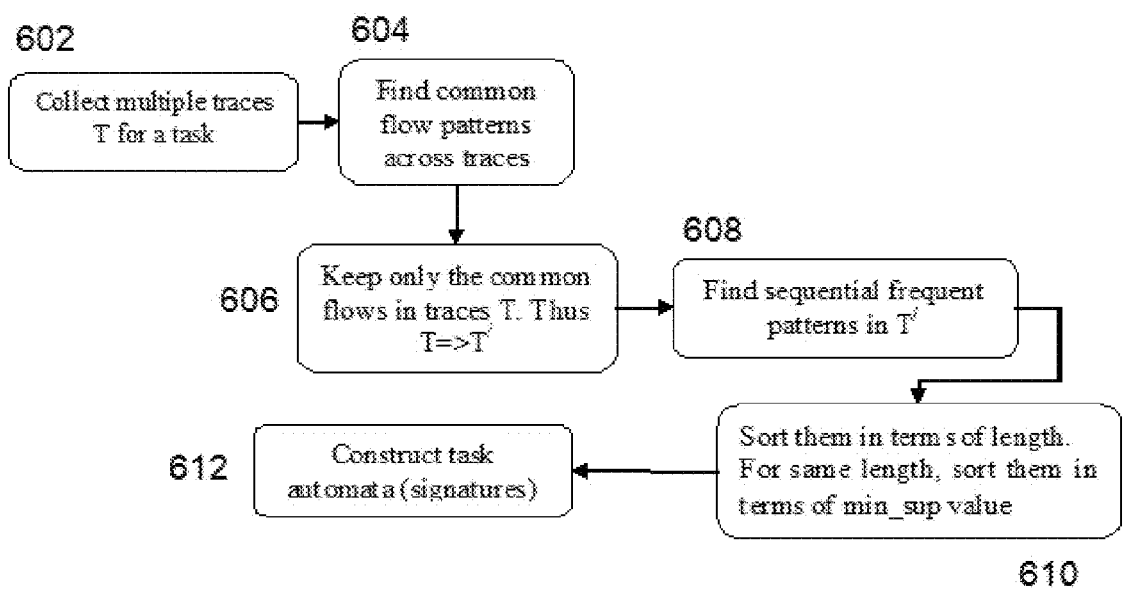
FIG. 6 depicts a flow chart for Procedure 3.

The goal of the task signature is to capture the stable sequence of flows for each operational task (e.g., common tasks in data centers like VM (virtual machine) migration, attaching a device, rebooting a server) and to represent them by sequence automata. A flow chart for computing a task signature for a specific task is given in FIG. 6. First, OFDiff collects multiple traces T for a task in step 602 and finds common flow patterns across the traces in step 604. Next, OFDiff keeps or stores only the common flows in the traces T in step 606, meaning that T≥T', where T' denotes the common flows. OFDiff further finds sequential frequent patterns in T' in step 608 and sorts them in terms of length in step 610. For the same length, OFDiff sorts them in terms of the support value or the minimum support (min_sup) value in step 610. Then, OFDiff constructs task automata or task signatures in step 612.

It should be noted that the operator task sequence increases the accuracy of debugging, but is not compulsory for debugging method. Also, it could be used stand alone to validate network operations initiated by the operator or operator's agent.

Procedure 4: Validating Changes

Figure 7:
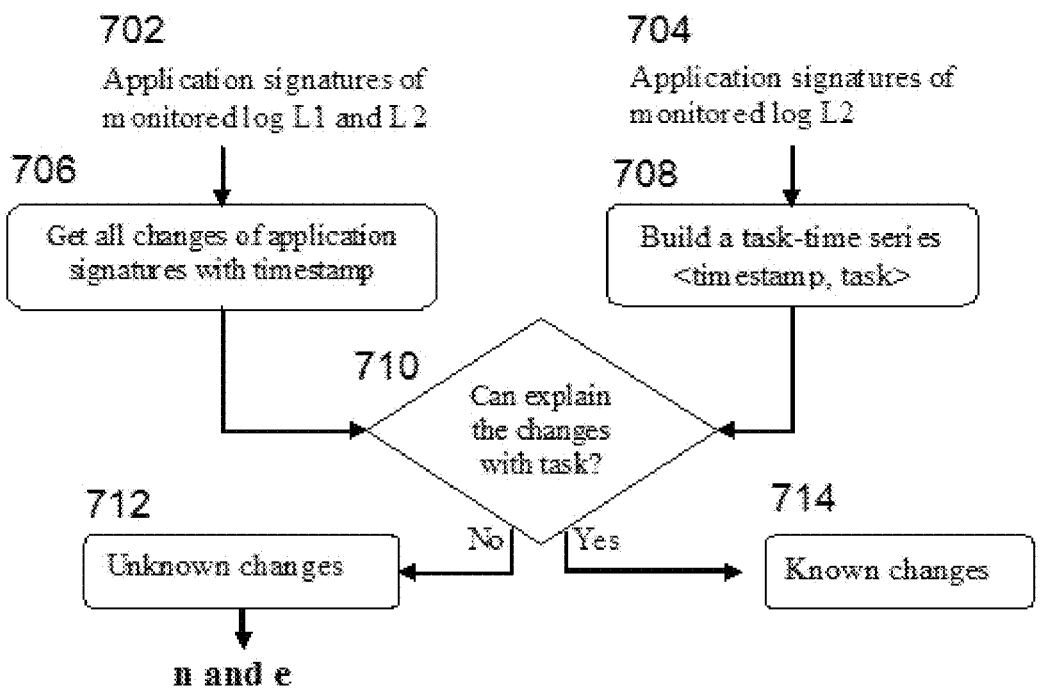
FIG. 7 depicts a flow chart for Procedure 4.

Referring to FIG. 7, changes identified by comparing the models in the previous sections are checked for known (714) and unknown (712) changes in both application and infrastructure layers. Known changes 714 are the changes that are done intentionally and can be explained by valid operational tasks in the systems. To differentiate between known (714) and unknown (712) changes, we use task signature. The task signature builds a task sequence from the given log in step 708. When an application change is detected in step 706, OFDiff checks the task-time series to find related operational tasks around the same time when the change happened in step 710.

Here, n in FIG. 7 is the list of application nodes related to the unknown changes, e in FIG. 7 is list of application flows related to the unknown changes.

Procedure 5: Debugging

The debugging comprises two procedures: Procedure 5.1 includes correlating to problem class, which finds the possible problem class in the data center. Procedure 5.2 including correlating to system contexts, which finds the problematic or faulty data center components causing the problem in the data center.

Procedure 5.1: Correlating to Problem Class

Figure 8:
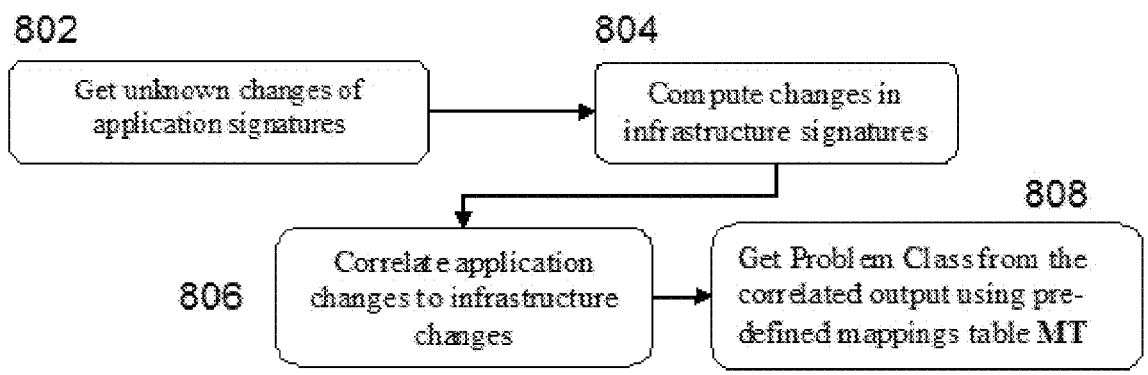
FIG. 8 depicts a flow chart for Procedure 5.1.

Referring to FIG. 8, once we detect a change in the application signatures for the given logs in step 802, we compute related changes in their infrastructure signatures in step 804 and correlate the dependency of application and infrastructure changes in step 806. Using the correlation output, we classify the current data center problems to one of these known classes in step 808.

Before this comparison, we initially build a correlation mapping table (MT) that includes the mapping of the application and related infrastructure signature changes to different problem classes such as host failure, host performance problem, network disconnectivity and so on. For example, if the delay distribution (DD), partial correlation (PC) values and flow statistics (FS) of some applications change along with the related inter-switch latency, there is a possibility of the network bottleneck problem class.

Procedure 5.2: Correlating to System Components

Figure 9:
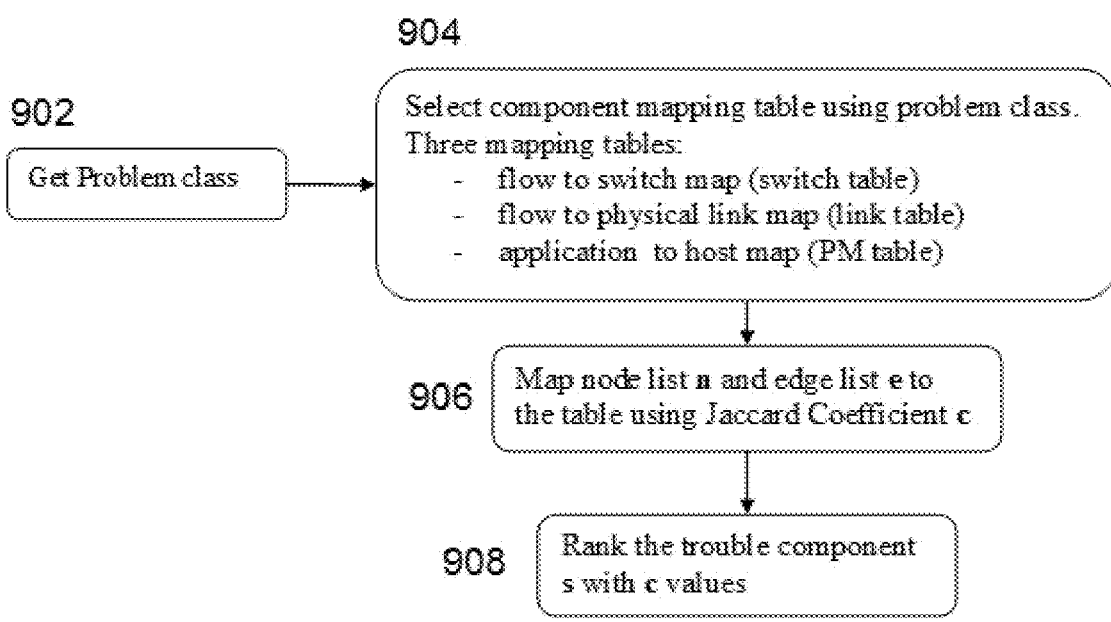
FIG. 9 depicts a flow chart for Procedure 5.2.

Referring to FIG. 9, to detect the faulty component in step 908 from problem class 902, OFDiff first generates three tables using infrastructure signature: a link table, a switch table and a PM (physical machine) table in step 904. The link table maps the application level flows to the sequence of underlying physical links that the flows traverse. The switch table maps the application level flows to the sequence of switches the flows traverse and finally the PM table maps the application processes to the physical hosts. Depending on problem class 902, specific tables are selected in step 904 to correlate the changes to specific components in the data center in step 906.

Procedures 5.1 and 5.2 Scale the Debugging Techniques.

OFDiff contributes to achieving system situation awareness and troubleshooting using a combination of multiple novel signature modeling techniques. Although, these goals are achieved by leveraging the unique light-weight sensing mechanism of OpenFlow technologies, many of the proposed techniques are general and can be applied to other systems. In particular, Procedure 3 modeling task signature is a supervised learning based mechanism to create fingerprints of common data center tasks using network flows, and can be used standalone to validate these tasks at later time and also as a part of OFDiff in debugging.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention.

What is claimed is:

1. A debugging method used for a data center in a network, the method comprising:
   monitoring network traffic by collecting traffic information from a network controller;
   modeling an application signature, an infrastructure signature, and a task signature using a monitored log;
   detecting a change in the application signature between a working status and a non-working status using a reference log and a problem log;
   validating the change using the task signature;
   providing troubleshooting information;
   partitioning the monitored log into a plurality of time intervals, and computing the application signature for the plurality of time intervals; and
   determining that the application signature is a stable signature if the application signature for an application group does not change substantially across the plurality of time intervals,
   wherein an unknown change in the application signature is correlated to a known problem class by considering a dependency to a change in the infrastructure signature,
   wherein the network comprises an OpenFlow network and the traffic information is collected through at least one of PacketIn and PacketOut messages, and
   wherein the application signature is modeled by at least one of connectivity graph (CG), delay distribution (DD), component interaction (CI), partial correlation (PC), and flow statistics (FS).

2. The debugging method as in claim 1, further comprising:
   detecting which application node talks and which application node is talked to by using source and destination IP (Internet Protocol) data included in the PacketIn message or in an IP header in a TCP (Transmission Control Protocol) packet; and
   generating the connectivity graph (CG) for each application group.

3. The debugging method as in claim 1, wherein the application signature comprises a peak of the delay distribution (DD), further comprising:
   detecting a shift in the peak or disappearance.

4. The debugging method as in claim 1, further comprising:
   measuring the component interaction (CI) at a node in the connectivity graph (CG) by using a flow volume at each of input and output edges of the node.

5. The debugging method as in claim 1, wherein a logging interval is divided into epoch intervals that are equal spaced, further comprising:
   measuring a flow count for each of two adjacent edges in the connectivity graph (CG) by using a PacketIn message at each epoch interval; and
   computing the partial correlation (PC) over time-series data by using Pearson's coefficient.

6. The debugging method as in claim 1, further comprising:
   measuring a statistical value of an application flow at an application edge of an application node.

7. The debugging method as in claim 6, wherein the statistical value includes at least one of a flow count per unit time and a flow size.

8. The debugging method as in claim 6, further comprising:
   storing max, min, and average values of the statistical value.

9. The debugging method as in claim 1, wherein the infrastructure signature is modeled by at least one of physical topology, inter-switch latency, and OpenFlow controller characterization.

10. The debugging method as in claim 9, wherein the physical topology comprises a physical topology map, further comprising:
    generating the physical topology map based on the PacketIn and PacketOut messages.

11. The debugging method as in claim 9, wherein the inter-switch latency comprises a delay between two network switches, further comprising:
    computing the inter-switch latency by using a timestamp of the PacketIn message,
    wherein the PacketIn message is transmitted from each of the two network switch in response to a flow that has no matching entry and received at the network controller at the timestamp.

12. The debugging method as in claim 9, wherein OpenFlow controller characterization comprises a controller response time, further comprising:
    measuring the controller response time by using a difference between timestamps of the PacketIn message and the PacketOut message,
    wherein the PacketOut message is transmitted from the network controller in response to the PacketIn message.

13. The debugging method as in claim 1, wherein the task signature comprises a task automaton obtained by:
    collecting multiple traces for a task;
    finding one or more common flow patterns across the multiple traces;
    storing said one or more common flow patterns in the multiple traces;
    finding one or more sequential frequent patterns in said one or more common flow patterns;
    sorting said one or more sequential frequent patterns in length; and
    constructing a task automaton.

14. The debugging method as in claim 1, wherein the change is categorized into the unknown change or a known change in an application layer and an infrastructure layer by using the task signature.

15. The debugging method as in claim 1, wherein the correlation is performed by:
    computing a change in the infrastructure signature;
    correlating the unknown change in the application signature to the change in the infrastructure signature; and
    obtaining the known problem class with reference to a predefined mapping table.

16. The debugging method as in claim 1, further comprising:
    correlating the unknown change to a system component by using one or more of:
    a link table to map an application level flow to a sequence of underlying physical links,
    a switch table to map the application level flows to a sequence of switches, and
    a physical machine (PM) table to map an application process to a physical host.

* * * * *